United States Patent [19]

Kraus

[11] 4,215,595
[45] Aug. 5, 1980

[54] TRACTION ROLLER TRANSMISSION
[75] Inventor: Charles E. Kraus, Austin, Tex.
[73] Assignee: Excelermatic, Inc., Austin, Tex.
[21] Appl. No.: 921,163
[22] Filed: Jul. 3, 1978
[51] Int. Cl.[2] .......................................... F16H 13/06
[52] U.S. Cl. ........................................ 74/798; 74/208
[58] Field of Search ................ 74/202, 206, 208, 796, 74/798

[56] References Cited

U.S. PATENT DOCUMENTS

| | | | |
|---|---|---|---|
| 771,541 | 10/1904 | Ericson | 74/208 |
| 1,071,719 | 9/1913 | Fast | 74/798 |
| 1,704,205 | 3/1929 | Oakes et al. | 74/208 |
| 3,475,993 | 11/1969 | Hewko | 74/798 |
| 3,610,060 | 5/1970 | Hewko | 74/208 |
| 4,052,915 | 10/1977 | Kraus | 74/798 |

Primary Examiner—Ramon S. Britts
Assistant Examiner—Robert W. Gibson, Jr.
Attorney, Agent, or Firm—Klaus S. Bach

[57] ABSTRACT

A traction roller transmission having a number of traction rollers disposed in an annular space formed between a sun roller structure rotatable with one shaft and a traction ring structure surrounding the sun roller. The traction rollers are rotatably supported and the traction rollers or the traction ring structures are mounted for movement with another shaft. The traction rings or sun roller structures have Belleville type discs disposed between cam structures such that a torque transmitted through the transmission forces the traction rings toward each other for firm engagement of the traction rollers with the traction ring and the sun roller structures.

5 Claims, 5 Drawing Figures

TRACTION ROLLER TRANSMISSION

BACKGROUND OF THE INVENTION

1. Field of the Invention

The invention relates to fixed ratio traction roller transmissions in which the contact forces applied to the traction surfaces which are in engagement with each other for the transmission of movement are dependent on the torque transmitted through the transmission.

2. Description of the Prior Art

Traction roller transmissions in which large contact forces are applied to prevent slippage of the rollers are described for example by Harold A. Rothbart in "Mechanical Design And Systems" Handbook pages 14–8 and 14–9, McGraw-Hill, New York, 1964. In the relatively simple arrangements of FIGS. 14.6 and 14.7 wherein the outer rings are slightly undersized to compress the roller arrangements, the surface pressure on the traction surfaces is always the same, that is, it is always high independently of the torque transmitted through the transmission. Various transmission arrangements are also known in which the contact pressure of the traction surfaces is dependent on the size of the torque transmitted through the transmission for example as in those shown on page 14–8 of said handbook. Other transmissions of this type are shown in U.S. Pat. Nos. 771,541; 1,212,462; 1,704,205; 1,956,934; 3,610,060 and Swedish Patent No. 281,542.

In the arrangement shown in U.S. Pat. No. 771,541 the variable compressive forces are obtained by an outer ring structure so arranged that the ring is compressed when a torque is transmitted through the transmission. However, the arrangement requires sliding surface areas which are difficult to manufacture or complicated lever arrangements which amplify the reaction forces of the transmission to provide sufficient compression of the outer ring for its engagement with the traction rollers. Furthermore, there is a discontinuity in the outer ring structure which, with the large forces taken up by the ring structure, may well lead to premature failures.

SUMMARY OF THE INVENTION

In a traction roller transmission having coaxial input and output shafts a sun roller structure is supported by one of the shafts and traction rollers are disposed around the sun roller, while a traction ring structure surrounds, and is in contact with, the traction rollers. At least one of the traction ring and sun roller structures includes a plurality of belleville type spring rings arranged between means for forcing the spring rings toward each other so as to cause their engagement with the traction rollers and engagement of the traction rollers with the sun roller and the traction ring structures.

The belleville type spring rings are normally slightly conical in shape and, when compressed, their radially outer areas are stressed and their inner areas compressed so that their inner diameter is decreased while their outer diameters are increased.

DESCRIPTION OF THE PREFERRED EMBODIMENT

Figure 2:
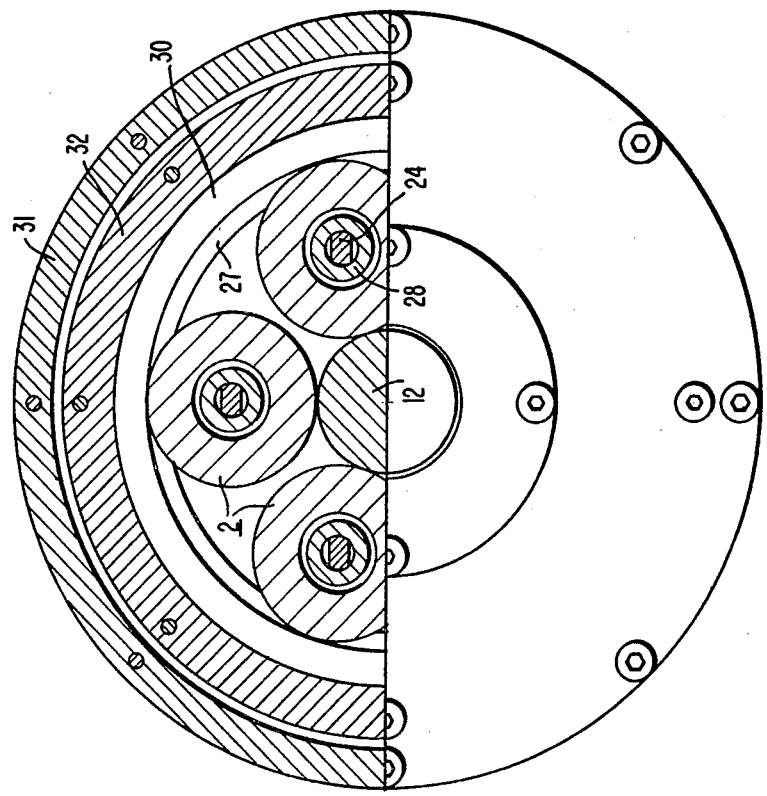
FIG. 2 is a cross-sectional view taken along line II—II of FIG. 1.
Figure 1:
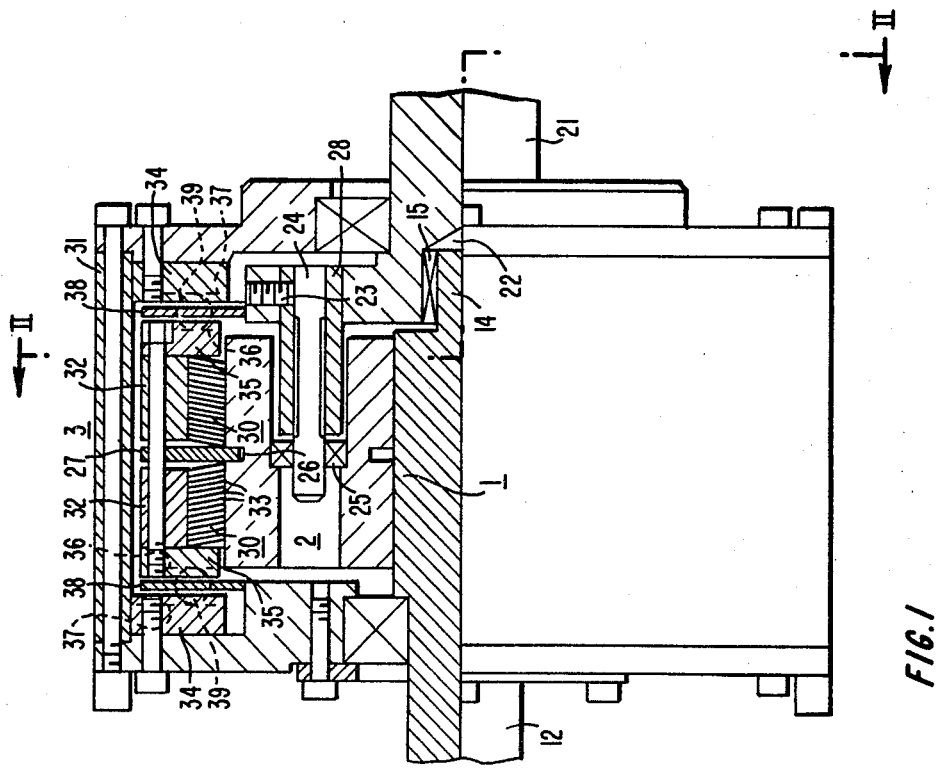
FIG. 1 is a partially cross-sectional view of a traction roller transmission.

FIGS. 1 and 2 show a traction roller transmission including basically a sun roller 1 centrally disposed within a traction ring assembly 3 and traction rollers 2 arranged in the annular path between the sun roller 1 and the traction ring assembly 3.

The sun roller 1 is part of, or mounted on, an input shaft 12 for rotation therewith. The input shaft 12 has a trunnion 14 extending into a bore 22 in an output shaft 21 and is supported therein by a bearing 15. The output shaft 21 has a flange 23 which carries studs 24 on which the traction rollers 2 are supported by roller bearings 25. The studs 24 may extend through the traction rollers 2 and, at the other end, may be interconnected by a support ring (not shown) for greater stability. In the arrangement as shown, however, the studs 24 are supported only at one end by the flange 23 and they are flexible to permit limited radial movement of the traction rollers 2. The limits of deflection of the studs 24 is determined by the clearance between the studs 24 and tubular support members 28 through which the studs 24 extend.

The traction rollers 2 are cylindrical and are in frictional engagement with the sun roller 1. As shown in FIG. 1, each has a central groove 26 receiving a guide disc 27 associated with the traction ring assembly 3.

The traction ring assembly 3 consists of a housing ring 31 enclosing two support ring structures 32 which house belleville type rings 30 with inner traction surfaces 33 in engagement with the traction rollers 2. Cam rings 34 are mounted at the axially opposite ends of the housing ring 31 adjacent inner cam rings 35 between which the belleville type rings 30 are located. The opposite surfaces of the outer cam rings 34 and the inner cam rings 35 are provided with cam surfaces 36 and 37 and rollers or balls 39 are held in the space between the cam surfaces by cage rings 38 so that relative rotational movement between the cam rings 35 and the housing ring 31 with its cam rings 34 forces the cam rings 35 and spring ring housings 32, together with the spring discs 30, toward each other and axially compresses the belleville springs 30 which forces their inner surfaces 33 into firm engagement with the traction rollers 2.

There is normally sufficient play in bearings so that, with close tolerances in manufacture, the compressive forces of the belleville springs are transmitted through the traction rollers to the sun roller and are not taken up by the traction roller bearings. But it is also possible to mount the traction roller bearings in sleeves which have eccentric bearing support openings and which are rotatably supported in the traction rollers so as to permit—within limits—free radial movement of the traction rollers. In another solution the traction rollers may simply be held in a cage such as a roller bearing cage which cage may be connected to the flange 23 and may have for each traction roller a radial gap that permits slight radial movement of the traction rollers.

In alternative arrangements, the housing ring could for example be part of a transmission housing in which the input and output shafts are supported, or the traction rollers could be mounted stationarily that is rotatably only about their support studs which support studs would then be supported by the transmission housing while the output shaft is connected to the housing ring which carries the traction rings. It is further possible that both, the traction rollers and the traction ring, are connected to output shafts of which one may selectively be held in stationary position.

In the embodiment shown in FIGS. 1 and 2, the belleville type spring rings are associated with the ring assembly 3. They may, however, just as well be associated with the sun roller as illustrated in FIG. 3 in connection with which only the sun roller structure will be described as the other parts of the transmission are essentially identical to those described in connection with FIG. 1.

Figure 3:
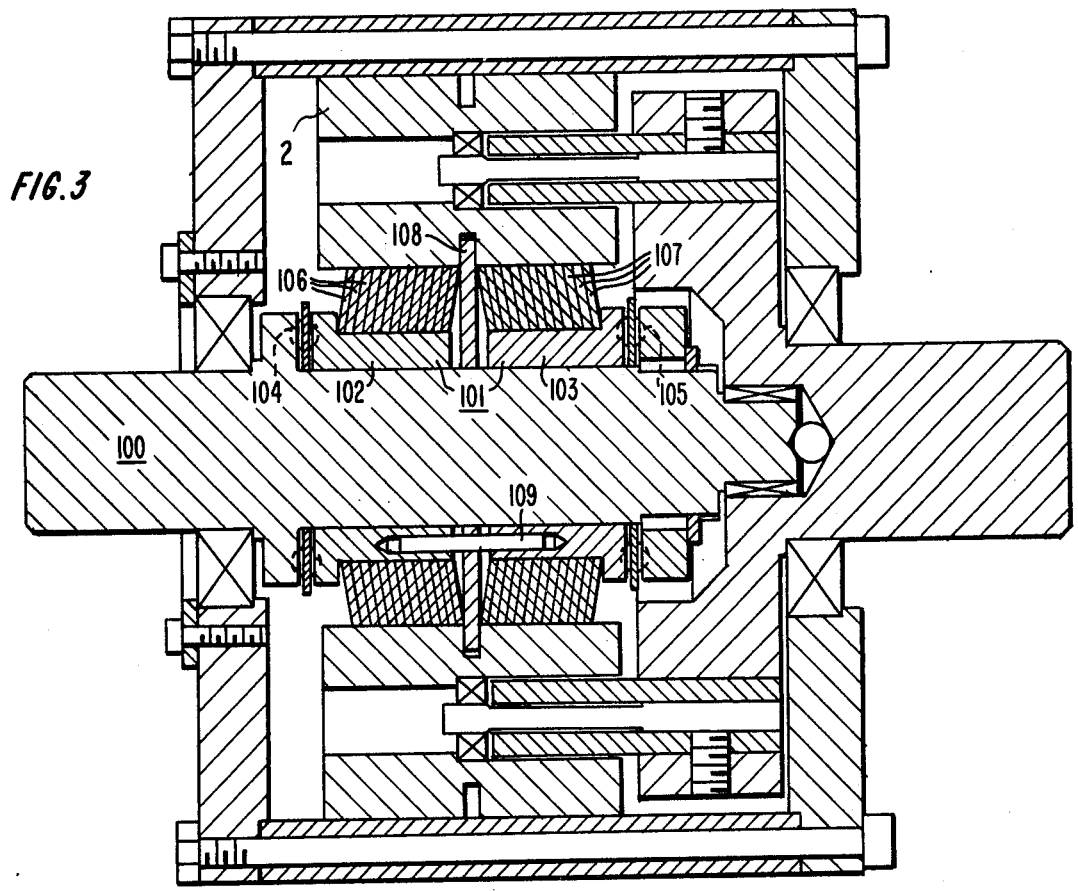
FIG. 3 shows an embodiment with the spring rings mounted on the sun roller.

The sun roller structure 101 as shown in FIG. 3 consists of two parts 102 and 103 axially movably mounted on the shaft 100 between two axial loading cam structures 104 and 105. Belleville type spring rings 106 and 107 are disposed on the two sun roller parts 102 and 103 such that their compression by the two sun roller parts 102 and 103 upon transmission of a torque causes their radial expansion into firm engagement with the adjacent traction rollers 2. Arranged between the two stacks of belleville type spring rings is a guide disc 108 corresponding in function to the guide disc 27 of FIG. 1.

The belleville type discs flatten under axial load whereby their radial outer areas are stressed and their radial inner areas are compressed. When radially unrestrained, as shown in FIG. 1 and in an enlarged partial view in FIG. 4, their outer diameters will slightly increase and their inner diameters will slightly decrease.

Figure 5:
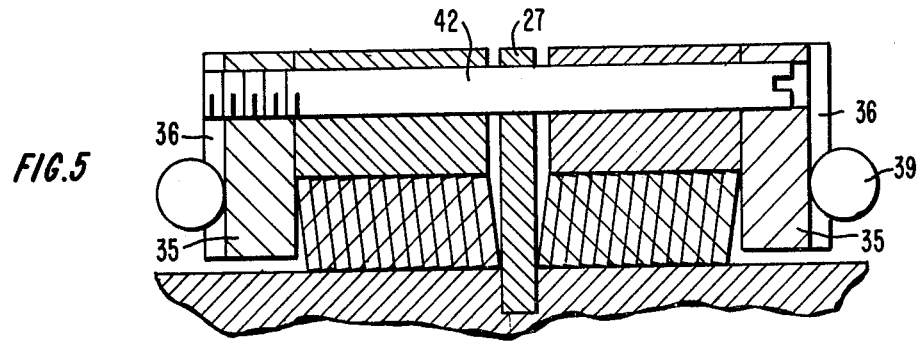

However, the belleville spring rings may be restrained at their outer or inner circumference so that they can expand only in one radial direction, i.e. inwardly if the restraint is at their outer end as in the arrangement of FIG. 3 which is shown in greater detail in FIG. 5 or outwardly if the restraint is at their inner end.

Figure 4:
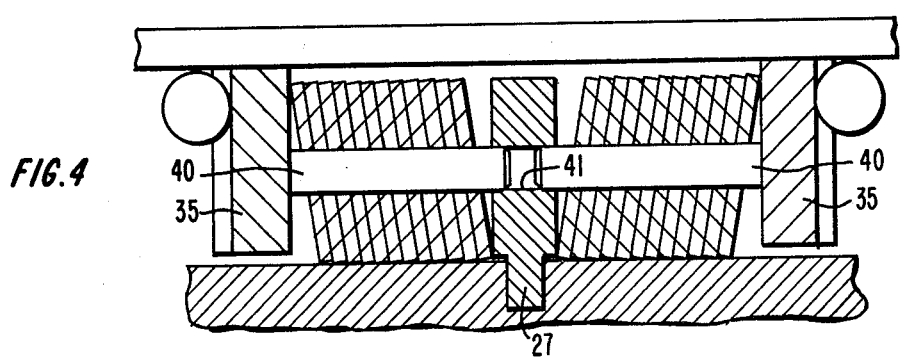
FIGS. 4 and 5 show spring ring arrangements for different embodiments of the invention.

In the arrangement as schematically shown in FIG. 4 the belleville spring rings have aligned openings and pins 40 which are fastened to the cam rings 35 extend through the openings and into a passage 41 in the guide ring 27 for retaining the spring rings and securing the opposite cam rings 35 relative to each other.

In the arrangement as schematically shown in FIG. 5 guide pins 42 extend through the ring structures 32 and the guide ring 27 and are fastened in one of the cam rings 35 while being axially movable in the other.

Both arrangements may, of course, be used in connection with the outer traction ring structure or with the inner sun roller structure.

If, upon transmission of a torque, the belleville rings are deflected to be about flat, further axial loading will no longer increase their radial expansion. The cam structures may be so designed that the cam rings jump the balls when a predetermined torque is reached so that no torque of larger than the desired value can be transmitted. However, unless this is a desired feature, it is preferred to use spring rings wherein only a small part of the possible deflection is used up even under full load. In a 9000 HP drive with a sun roller diameter of 15.7 inches and spring ring inner diameter of 30 inches with an outer diameter of 34 inches and with 16 belleville spring rings of 0.5 inch thickness the total possible belleville ring deflection is 0.4 inch; but even at 200% load the actual deflection needed is only 0.0784 inch.

The invention, however, is not limited to the arrangement described herein. Although the belleville type spring rings are shown to be arranged in two symmetric stacks it would, of course, be possible to provide only one stack of spring rings or more than two. Like gear-type planetary transmissions, several transmissions using the principles of the present invention may be combined in one housing to form variable speed transmissions or, for large transmission ratios, differential type planetary transmissions.

The arrangements described permit the transmission through traction roller transmissions of relatively large loads without any spin on the traction surfaces while exposing the traction surfaces only to loads not larger than needed for the slipless transmission of torques. The transmissions are relatively small, simple in design and inexpensive.

Traction roller transmissions carefully designed and built in accordance with the present invention are capable of taking overloads which would shear the teeth off gear drives. With no spin they have a high efficiency and a life just as predictable as that of roller bearings.

I claim:

1. In a traction roller transmission comprising a traction ring structure having inner traction surfaces, a sun roller centrally disposed within the traction ring structure and having a circumferential traction surface spaced from the traction surface of said traction ring structure, planetary traction rollers supported in the space between the sun roller and the traction ring structure, and engagement means for forcing said traction rollers into frictional engagement with said traction ring structure and said sun roller; the improvement wherein at least one of said traction surfaces is formed by a stack of belleville type spring rings, and means are provided for axially compressing said belleville type spring rings when a torque is transmitted through said transmission so as to cause radial expansion of the spring rings for firm frictional engagement with the adjacent traction rollers.

2. A transmission as recited in claim 1, wherein said ring structure has a central guide ring associated therewith and said traction rollers have central grooves receiving said guide ring for axially holding the traction rollers, and wherein a stack of spring rings is disposed at each side of said central guide ring.

3. A transmission as recited in claim 1 or 2, wherein said means for forcing the traction rollers toward each other are axial cam structures disposed at opposite axial ends of said stacks of spring rings.

4. A transmission as recited in claim 1 or 2, wherein said spring ring stacks are associated with the traction ring structure and the traction rollers are surrounded by said spring rings such that axial compression of the spring rings causes their inner surfaces to engage the traction rollers and force them into firm engagement with the sun roller.

5. A transmission as recited in claim 1 or 2, wherein said spring rings are mounted on the sun roller and surrounded by the traction rollers such that axial compression of the spring rings causes their outer surfaces to engage the traction rollers and force them into firm engagement with the traction ring structure.

* * * * *